United States Patent [19]
Roehrich et al.

[11] Patent Number: 5,267,443
[45] Date of Patent: Dec. 7, 1993

[54] AIR CONDITIONING AND REFRIGERATION METHODS AND APPARATUS UTILIZING A CRYOGEN

[75] Inventors: Roland L. Roehrich, Pittsburgh, Pa.; Herman H. Viegas, Bloomington, Minn.

[73] Assignee: Thermo King Corporation, Minneapolis, Minn.

[21] Appl. No.: 982,336

[22] Filed: Nov. 27, 1992

[51] Int. Cl.$^5$ .............................................. F17C 9/04
[52] U.S. Cl. ...................................... 62/50.3; 62/167; 62/239
[58] Field of Search .............. 62/50.3, 332, 50.2, 62/167, 239

[56] References Cited

U.S. PATENT DOCUMENTS

| | | | |
|---|---|---|---|
| 3,121,999 | 2/1964 | Kasbohm et al. | 62/50.3 |
| 3,385,073 | 5/1968 | Snelling | 62/52.1 |
| 3,693,370 | 9/1972 | Miller | 62/175 |
| 3,802,212 | 4/1974 | Martin et al. | |
| 4,045,972 | 9/1977 | Tyree, Jr. | |
| 4,100,759 | 7/1978 | Tyree, Jr. | |
| 4,186,592 | 2/1980 | Tyree, Jr. | |
| 4,498,306 | 2/1985 | Tyree, Jr. | |
| 5,040,374 | 8/1991 | Michaeu | |
| 5,069,039 | 12/1991 | Martin | |
| 5,090,209 | 2/1992 | Martin | |

*Primary Examiner*—Ronald C. Capossela
*Attorney, Agent, or Firm*—M. J. Moran

[57] ABSTRACT

Methods and apparatus for controlling the temperature of a conditioned space to a predetermined set point temperature, utilizing a supply of cryogen in liquid and vapor states. The two states are drawn from the supply in two separate flow paths. The liquid cryogen is vaporized in a heat exchanger, and the two flow paths are then combined. The combined cryogen is used to drive a vapor motor connected to a fan, with the fan moving air between the conditioned space and the heat exchanger. Heat is applied to the cryogen as required to hold the set point temperature or to defrost the heat exchanger. In a preferred embodiment, the cryogen is added to a first vessel at the pressure provided by ground support apparatus, and expanded into a second vessel as a function of system conditions, to provide the supply of cryogen in both the liquid and vapor states.

57 Claims, 5 Drawing Sheets

AIR CONDITIONING AND REFRIGERATION METHODS AND APPARATUS UTILIZING A CRYOGEN

TECHNICAL FIELD

The invention relates in general to air conditioning and refrigeration systems, and more specifically to the use of a cryogen for controlling the temperature of a conditioned space of stationary and transport type air conditioning and refrigeration systems.

BACKGROUND ART

Air conditioning and refrigeration systems, both stationary and transport types, with transport types including those used on straight trucks, tractor-trailer combinations, and refrigerated containers, conventionally utilize a chlorofluorocarbon (CFC) refrigerant in a mechanical refrigeration cycle. The mechanical refrigeration cycle requires a refrigerant compressor driven by a prime mover, which often includes an internal combustion engine, such as a diesel engine. Because of the suspected depleting effect of CFC's on stratospheric ozone ($O_3$), practical alternatives to the use of CFC's in refrigeration are being sought.

The use of a cryogen, i.e., a gas which has been compressed to a very cold liquid state, such as carbon dioxide ($CO_2$) and nitrogen ($N_2$), in air conditioning and refrigeration systems is particularly attractive because, in addition to eliminating the need for a CFC, it also eliminates the need for a compressor and associated prime mover.

Thus, it would be desirable, and it is an object of the present invention, to provide reliable, practical methods and apparatus which utilize a cryogen in air conditioning and refrigeration systems.

SUMMARY OF THE INVENTION

The invention includes methods and apparatus for controlling the temperature of a conditioned space to a predetermined set point temperature, using a cryogen, such as liquid $CO_2$ or liquid $N_2$. For purposes of example, the specification will hereinafter refer to the cryogen as being $CO_2$, as $CO_2$ is especially suitable for use in certain embodiments of the invention, but it is to be understood that other cryogens may be used.

The methods include the step of providing a supply of $CO_2$ which includes $CO_2$ in liquid and vapor states. A cooling mode includes the step of cooling the air of the conditioned space via first heat exchanger means, including the step of vaporizing liquid $CO_2$ in the first heat exchanger means, combining vaporized $CO_2$ obtained from the vaporizing step with vaporized $CO_2$ from the supply, moving air from the conditioned space in heat exchange relation with the first heat exchanger means, and using the combined vaporized $CO_2$ to implement the air moving step. A heating mode for holding set point, or for defrosting purposes, includes the step of adding heat to the $CO_2$ at one or more selectable locations.

The apparatus includes air conditioning and refrigeration systems for controlling the temperature of a conditioned space to a predetermined set point temperature via a cooling mode, including a supply of $CO_2$ which includes $CO_2$ in liquid and vapor states, first heat exchanger means, means directing liquid $CO_2$ from the supply through the first heat exchanger means, vapor driven motor means, and fan means driven by the vapor driven motor means which moves air from the conditioned space in heat exchange relation with the first heat exchanger means to vaporize the liquid $CO_2$. Means is provided for combining vaporized $CO_2$ provided by the first heat exchanger means with vaporized $CO_2$ from the supply. Additional means directs the combined vaporized $CO_2$ through the vapor driven motor means to drive the motor and fan means. Means is provided for adding heat to the $CO_2$ at one or more selectable locations.

In a preferred embodiment of the invention, which embodiment is especially suitable when the cryogen is $CO_2$, the source of $CO_2$ in both liquid and vapor states is provided by a separate source of liquid $CO_2$ which is at the same temperature and pressure "as supplied" by ground support apparatus. This arrangement, which thus includes two insulated vessels, simplifies the filling process, and eliminates the venting of $CO_2$ vapor involved in known cryogenic refrigeration systems which start with a vessel filled with liquid $CO_2$ at a lower pressure and lower temperature than provided by ground support apparatus.

BRIEF DESCRIPTION OF THE DRAWINGS

The invention will become more apparent by reading the following detailed description in conjunction with the drawings, which are shown by way of example only, wherein.

DESCRIPTION OF PREFERRED EMBODIMENTS

As used in the following description and claims, the term "conditioned space" includes any space to be temperature and/or humidity controlled, including stationary and transport applications for the preservation of foods and other perishables, maintenance of a proper atmosphere for the shipment of industrial products, space conditioning for human comfort, and the like. The term "refrigeration system" is used to generically cover both air conditioning systems for human comfort, and refrigeration systems for preservation of perishables and shipment of industrial products. Also, when it is stated that the temperature of a conditioned space is controlled to a selected set point temperature, it is to be understood that the temperature of the conditioned space is controlled to a predetermined temperature range adjacent to the selected set point temperature. In the Figures, valves which are normally open (n.o.), are illustrated with an empty circle, and valves which are normally closed (n.c.) are illustrated with an "X" within a circle. Of course, the associated electrical or electronic control, hereinafter called "electrical control", may be changed to reverse the de-energized states shown. An arrow pointed at a valve in the Figures indicates that the valve is, or may be, controlled by the electrical control.

The invention is suitable for use with refrigeration systems associated with a single conditioned space to be controlled to a selected set point temperature; and, the invention is also suitable for use with refrigeration systems associated with a conditioned space which is divided into at least first and second separate insulated conditioned spaces to be individually controlled to selected first and second set point temperatures. In a compartmentalized arrangement, for example, one conditioned space may be used to condition a frozen load, and the other a fresh load, as desired.

Figure 1:
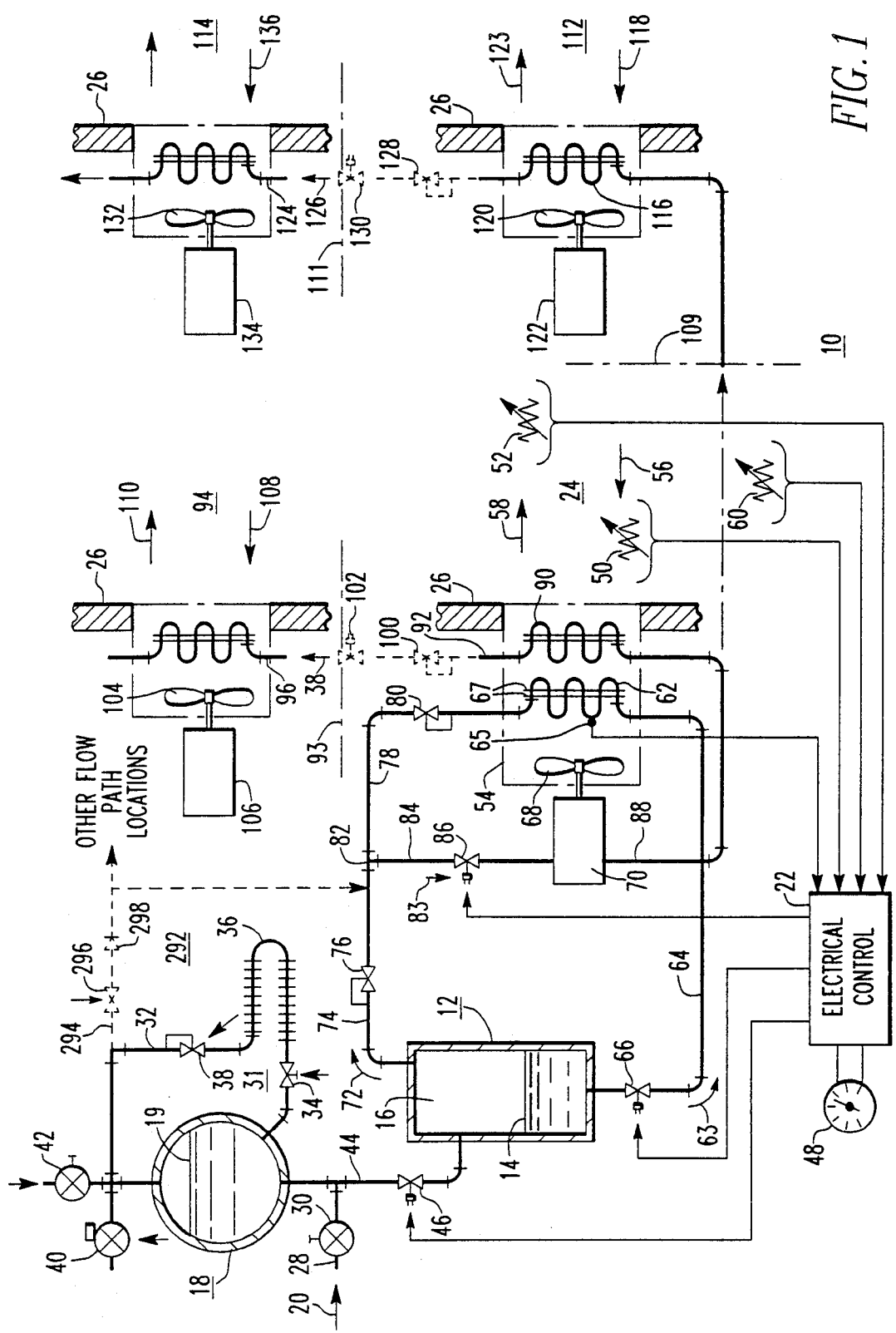
FIG. 1 is a diagrammatic representation of a refrigeration system constructed according to the teachings of the invention, illustrating cooling modes which utilize both liquid and vapor states of a cryogen.

Referring now to the drawings, and to FIG. 1 in particular, there is shown a refrigeration system 10 suitable for use with any conditioned space, and particularly well suited for use on straight trucks, tractor-trailer combinations, containers, and the like, with the word "vehicle" being used to generically refer to the various transport vehicles which utilize refrigeration systems.

Figure 2:
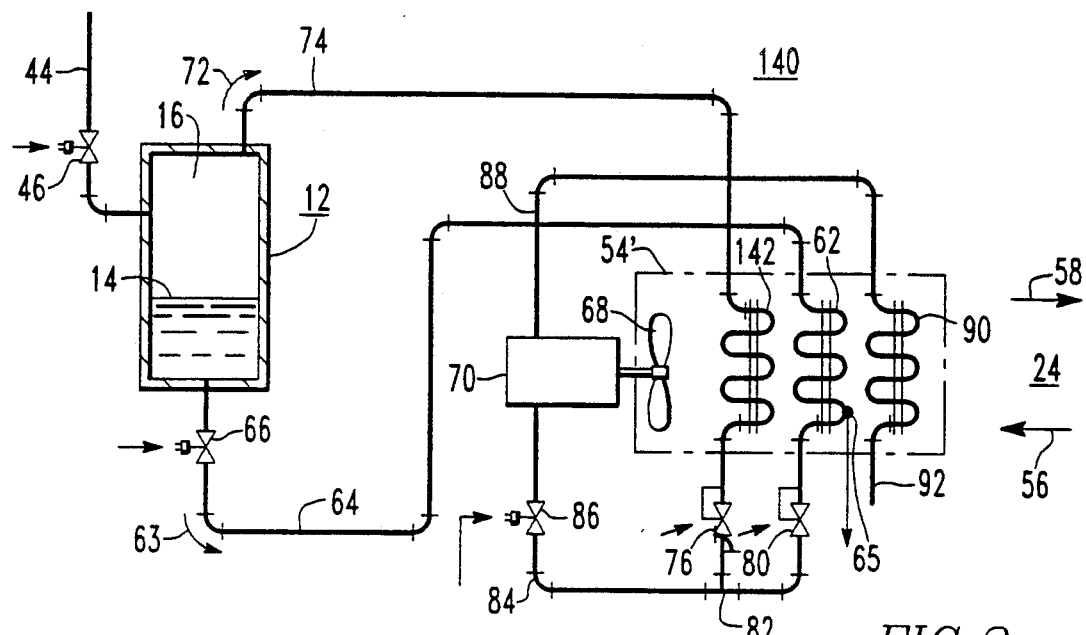
FIG. 2 is a diagrammatic representation of a refrigeration system illustrating another cooling mode embodiment of the invention.
Figure 3:
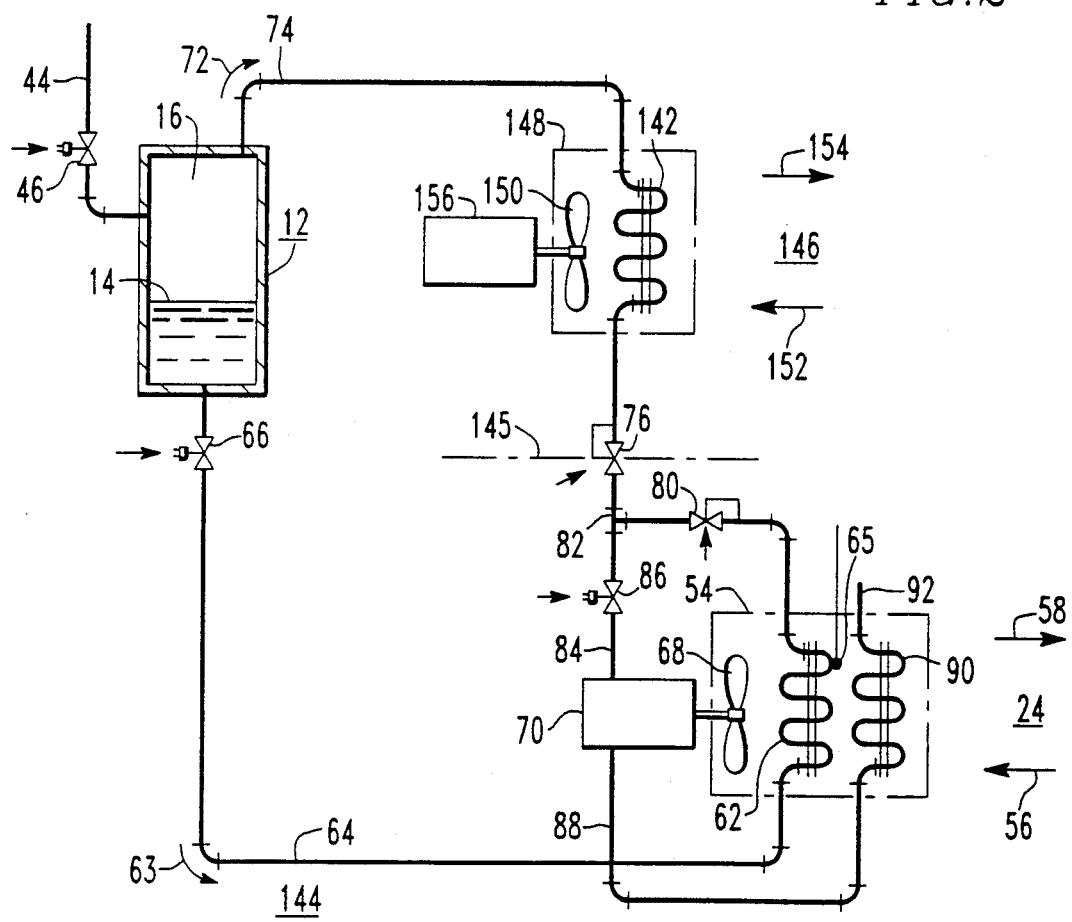
FIG. 3 is a diagrammatic representation of a refrigeration system illustrating still another cooling mode embodiment of the invention.
Figure 4:
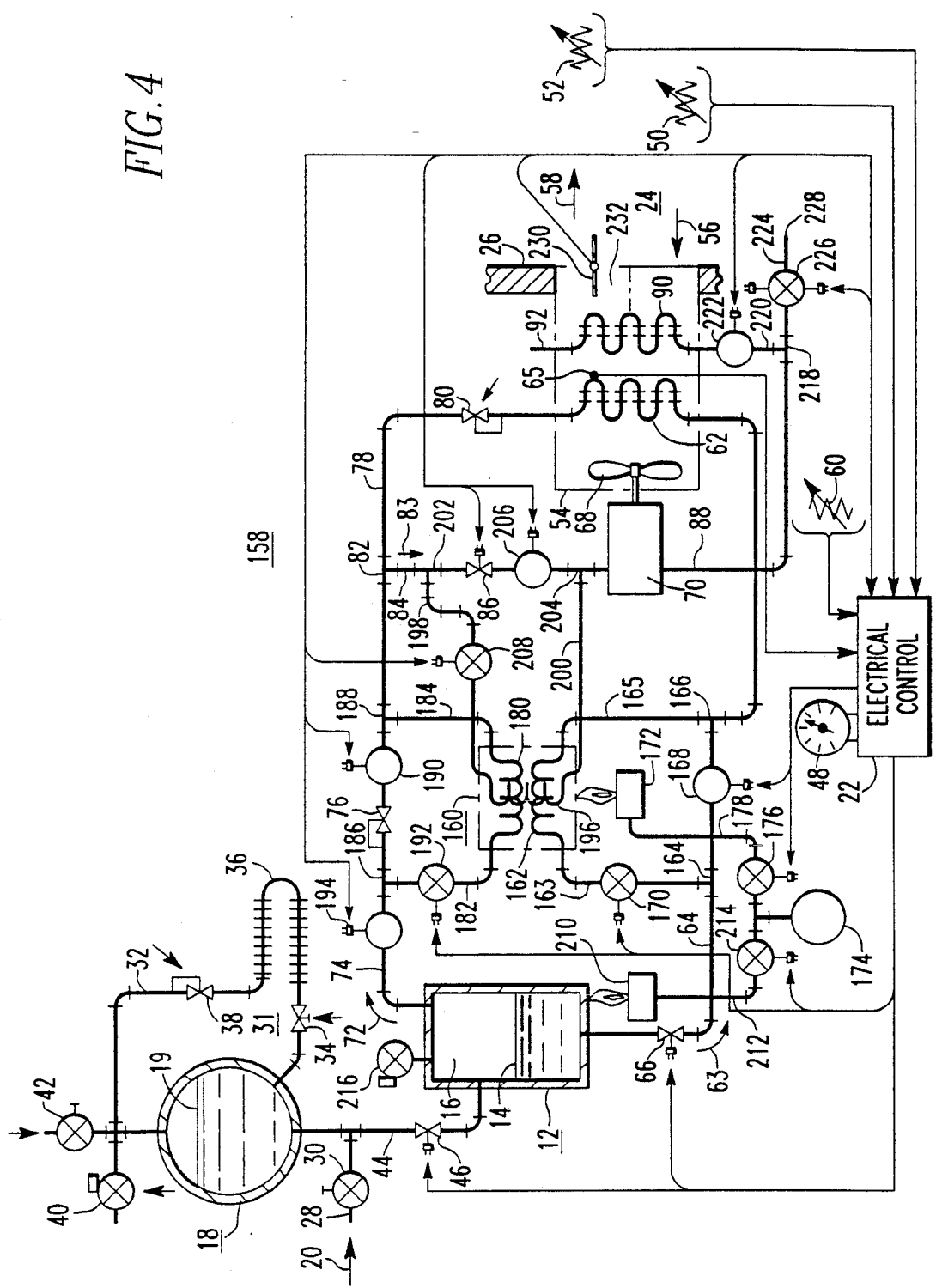
FIG. 4 is a diagrammatic representation of a refrigeration system constructed according to the teachings of the invention, illustrating both cooling and heating modes which utilize both liquid and vapor states of $CO_2$.
Figure 5:
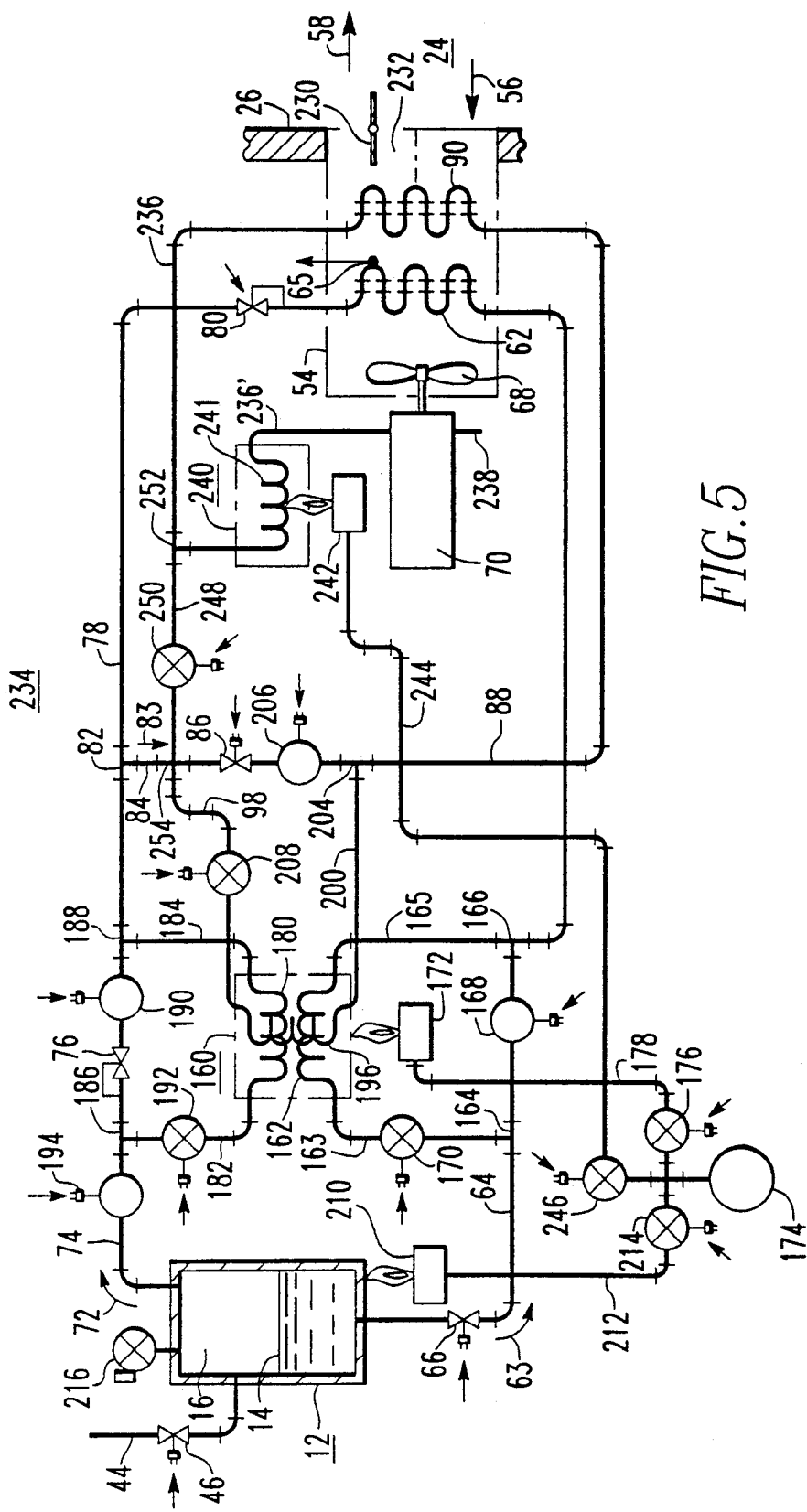
FIG. 5 is a diagrammatic representation of a refrigeration system illustrating additional heating and cooling mode embodiments of the invention.
Figure 6:
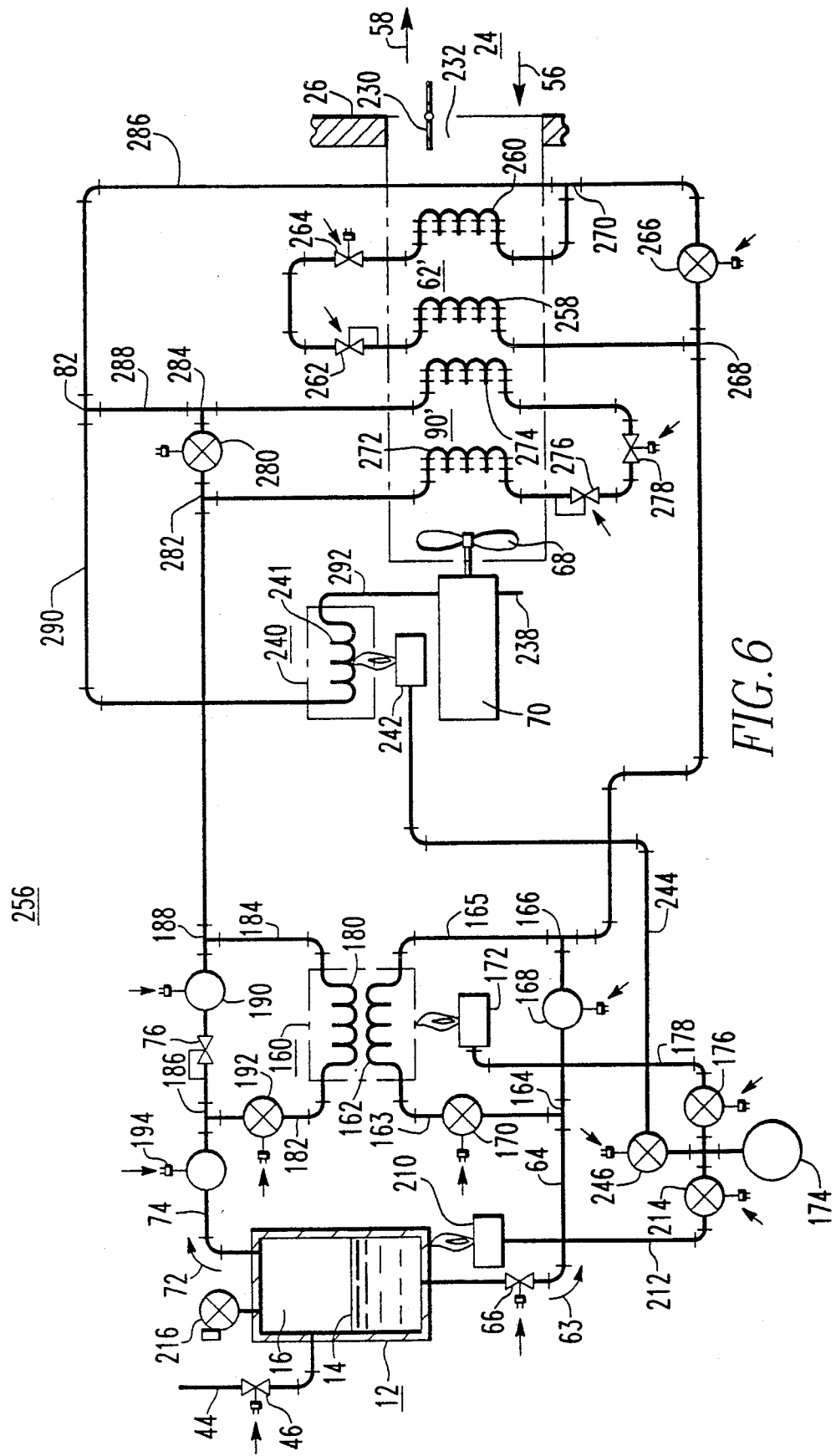
FIG. 6 is a diagrammatic representation of a refrigeration system illustrating still further heating and cooling mode embodiments of the invention.

FIG. 1, as well as other embodiments of the invention shown in FIGS. 2 and 3, illustrate new and improved cooling mode embodiments of the invention utilizing a cryogen. FIGS. 4, 5 and 6 add new and improved heating and cooling mode embodiments of the invention to the arrangements of FIGS. 1, 2 and 3, with the heating modes being used for defrosting purposes, as well as for maintaining a predetermined set point temperature in a conditioned space.

As hereinbefore stated, certain aspects of the present invention are particularly useful when $CO_2$ is selected for the cryogen, and for purposes of example the following description of the new and improved methods and apparatus of the invention will be described as utilizing $CO_2$ from a supply containing liquid and vapor phases.

More specifically, the inventive methods and apparatus of the invention utilize an insulated vessel 12 which contains $CO_2$ in both liquid and vapor forms, indicated at 14 and 16, respectively. As will be hereinafter explained, both forms of $CO_2$ are actively utilized in the cooling and heating cycles or modes of the invention.

The invention applies broadly to the use of a single vessel 12 containing a cryogen, with both liquid and vapor states thereof being actively used in heat exchange functions. In an embodiment of the invention which is particularly suitable when $CO_2$ is used for the cryogen, another insulated vessel 18 may be provided. The second vessel 18 is initially substantially completely filled with liquid $CO_2$ 19 from ground support apparatus shown generally at 20. No deliberate attempt is made to change the "as delivered" pressure and temperature of the $CO_2$. For example, if $CO_2$ is provided by ground support apparatus 20 at a pressure of 300 psia and temperature of 0° F. ($-17.8°$ C.), then vessel 18 will be filled with $CO_2$ at that pressure and temperature.

Prior art systems which utilize one supply vessel conventionally load the vessel with lower pressure $CO_2$, such as 100 psia, which reduces the temperature to $-58°$ F. ($-50°$ C.). As shown on a temperature-entropy diagram for $CO_2$, reducing the pressure from an "as supplied" pressure of 300 psia, for example, to 100 psia, causes about 20% of the $CO_2$, by weight, to vaporize. This complicates the filling procedure, and the vaporized $CO_2$ is either wasted by venting it to the atmosphere, or a vapor recovery system must be used. The lower temperature of the prior art single supply vessel, i.e., $-58°$ F. ($-50°$ C.), as opposed to 0° F. (-17.8° C.) in the initial supply vessel when using the two vessel arrangement of the invention, also results in a higher heat gain to the supply vessel because of the much greater $\Delta T$, which reduces the length of time a given supply vessel will maintain useful cryogen.

Utilizing two vessels 12 and 18 provides the freedom for an electrical control apparatus 22 to select an optimum intermediate operating pressure of the cryogen at any instant as a function of system needs, ie., the intermediate operating pressure is selected and varied, as required, based upon a selected set point temperature, the actual temperature of a conditioned space 24, which may be stationary or associated with a vehicle shown generally at 26, and the ambient temperature. It is to be understood that the two vessels 12 and 18 may be disposed side-by-side and insulated as a single package, and that two vessels may be provided by partitioning a single vessel.

More specifically, vessel 18 is filled with liquid $CO_2$, indicated at 19, by connecting the ground support apparatus 20 to a supply line or conduit 28 which includes a valve 30. Vapor pressure of the cryogen in vessel 18 is maintained above a predetermined value, which for $CO_2$ is the triple point thereof, i.e., 75.13 psia, by a known prior art pressure regulating arrangement 31 in which a conduit 32 connects a lower point of vessel 18 with an upper point. Conduit 32 includes a valve 34, a vaporizing coil 36, and a valve 38. Valve 34 opens when the pressure in vessel 18 falls to a predetermined value, admitting liquid $CO_2$ into vaporizing coil 36. Vaporizing coil 36 is exposed to ambient temperature outside of vehicle 26. Valve 38 then maintains the vapor pressure in vessel 18 at or above the predetermined level. A pressure reading safety valve 40 is also provided in conduit 32 at a point where vessel pressure may be directly sensed. A venting valve 42 is also provided to facilitate the filling process. Since vessel 18 is loaded from ground support apparatus 20 without a deliberate change of pressure, very little vapor will be vented, unlike prior art filling arrangements which reduce the pressure of the $CO_2$ during filling.

A conduit 44 extends from a low point of vessel 18 to an intermediate point of vessel 12. Conduit 44 includes an expansion valve 46 which is controlled by electrical control 22 as a function of system conditions at any instant. The expansion provided by expansion valve 46 is isenthalpic. For example, valve 46 may be controlled as a function the desired set point temperature, the temperature of conditioned space 24, and the ambient temperature. The set point temperature is selected by a set point temperature selector 48. The temperature of conditioned space 24 is sensed by either, or both, return air and discharge air temperature sensors 50 and 52. Temperature sensor 50 senses the temperature of air returning to an air conditioning means or apparatus 54, with the return air being indicated by arrow 56. Temperature sensor 52 senses the temperature of air being discharged by air conditioning means 54, with the discharge air being indicated by arrow 58. The temperature of ambient air is sensed by an ambient air temperature sensor 60.

Reducing the pressure of liquid $CO_2$ 19 via expansion valve 46 produces a combination of liquid $CO_2$ 14 and vaporized $CO_2$ 16 shown in vessel 12. If the exemplary pressure in vessel 18 is 300 psia, and the exemplary pressure in vessel 12 is 100 psia, the temperature of the saturated liquid and vapor states 14 and 16 will be about $-58°$ F. ($-50°$ C.). In the present invention, both the liquid and vapor states of the $CO_2$ are actively utilized in separate cryogen flow paths, and the separate flow paths are thereafter combined at a point downstream in the flow process, after the liquid $CO_2$ has been vaporized by absorbing heat in air conditioning means 54, i.e., from return air 56 drawn from conditioned space 24.

More specifically, liquid $CO_2$ 14 is admitted into a first heat exchanger 62 via a first active cryogen flow path 63 which includes a conduit 64 and feed control valve 66. Heat exchanger 62, which is disposed in air conditioning means 54, is disposed in heat exchange relation with return air 56 being drawn from conditioned space 24. Heat in return air 56 is absorbed into the liquid $CO_2$, with heat exchanger 62 being designed to completely vaporize the liquid $CO_2$. Thus, heat exchanger 62 may also be called an "evaporator coil", since its function is to evaporate all of the liquid $CO_2$ allowed to flow into it by flow control valve 66. As is known in the art, heat exchanger 62 may include a plurality of fins 67 for aiding heat transfer.

A temperature sensor 65 is disposed to sense the surface temperature of heat exchanger 62 at a location at or near the exit end of heat exchanger 62 to detect the degree of superheat in the vaporized cryogen, as well as detecting when evaporation may not be 100%, such as when surface ice builds up on heat exchanger 62. Thus, temperature sensor 65 may be used to enable electrical control 22 to control the flow rate of cryogen through valve 66 to maintain a desired degree of superheat in the vaporized cryogen exiting heat exchanger 62, as well as to trigger a defrost mode or cycle.

The conditioned air 58, which results from the heat exchange relation between the return air 56 and heat exchanger 62, is discharged back into conditioned space 24. Conditioned air does not mix with $CO_2$ at any point in the refrigeration systems of the invention. Thus, there is never any contamination of conditioned space 24 with $CO_2$. Refrigeration system 10 may be used in combination with arrangements which do inject $CO_2$ into a conditioned space for fast temperature pull down and/or for load preservation. In such combined applications either vessel 12 or 18 may be used as the source of the $CO_2$.

As will be hereinafter explained, air in conditioned space 24 is drawn into air conditioning means 54, and discharged back into conditioned space 24, by a fan or blower 68 which is driven by vaporized $CO_2$ in a suitable vapor motor or turbine 70, which will hereinafter be referred to as vapor driven motor 70.

A second active cryogen flow path 72, which includes a conduit 74 and a pressure regulating valve 76, withdraws vaporized $CO_2$ 16 from vessel 12 under the regulation of valve 76 which maintains a vapor pressure in vessel 12 above the triple point.

Vaporized $CO_2$ from the exit end of heat exchanger 62 is directed, via a conduit 78 and a pressure regulating valve 80, to join conduit 74 at a tee 82 to form a third or combined cryogen flow path 83. Thus, vaporized $CO_2$ 16 from vessel 12 is combined with the vaporized $CO_2$ resulting from the vaporization of liquid $CO_2$ 14 in heat exchanger 62. The third flow path 83 starts at the output side of tee 82, with tee 82 being connected to vapor motor 70 via a conduit 84 which includes an expansion valve 86. Expansion valve 86, which isenthalpically expands the vaporized $CO_2$, may have a manually adjustable orifice, or, as illustrated, the orifice size may be controlled by electrical control 22. The vaporized $CO_2$ is isentropically expanded in vapor motor 70, driving motor 70 and the fan or blower 68 connected thereto The vaporized, isentropically expanded $CO_2$ is directed from vapor motor 70 via a conduit 88 to a second heat exchanger 90 disposed in air conditioning means 54. The second heat exchanger 90 may have a surface temperature sensor (not shown), if desired to indicate when defrosting is necessary. Vaporized $CO_2$ may be discharged from the exit end 92 of the second heat exchanger, e.g., to the atmosphere, after absorbing additional heat from the return air 56. In a stationary application, the $CO_2$ may be collected and compressed into a cryogenic state for reuse.

The two heat exchangers 62 and 90 allow the cooling of conditioned space 24 to be staged, if desired, i.e., using both heat exchangers 62 and 90 during initial temperature pull down of conditioned space 24, and then a selected one of the two heat exchangers may be de-activated as the temperature of the conditioned space 24 enters a predetermined temperature range adjacent to the selected set point temperature.

If conditioned space 24 is divided into first and second compartments via divider means 93, thus defining a second conditioned space 94, the exit end 92 of the second heat exchanger 90 may be connected to a third heat exchanger 96 via a conduit 98 which includes a pressure regulating valve 100 and an expansion valve 102, shown in phantom between heat exchangers 90 and 96. Pressure regulating valve 100 maintains a predetermined pressure in the second heat exchanger 90, and the expansion valve 102 drops the pressure and temperature of the vaporized $CO_2$ which enters the third heat exchanger 96. A fan or blower 104, which may be directly driven by an electric or hydraulic motor 106, or by a suitable pulley and belt arrangement (not shown) from a suitable power source, draws air 108 from the second conditioned space 94, and discharges conditioned air 110 back into the second conditioned space 94.

When conditioned space 24 is divided into first, second and third compartments via divider means 109 and 111, thus defining second and third additional conditioned spaces 112 and 114, respectively, the conduit 88 from the exit side of vapor motor 70 may be directly connected to serve the second conditioned space 112 via a second heat exchanger 116. Heat exchanger 116 is disposed in heat exchange relation with return air 118 from the second conditioned space 112, instead of being connected to the second heat exchanger 90, which is eliminated. Return air 118 from the second conditioned space 112 is drawn in heat exchange relation with the second heat exchanger 116 by a fan or blower 120 driven by an electric or hydraulic motor 122, or a suitable power source via a belt and pulley (not shown), and the resulting conditioned air 123 is discharged back into the second conditioned space 112.

The output end of the second heat exchanger 116 is connected to serve the third conditioned space 114 via a third heat exchanger 124. A conduit 126, a pressure regulating valve 128, and an expansion valve 130, shown in phantom, interconnect the second heat exchanger 116 with the third heat exchanger 124. Pressure regulating valve 128 maintains a predetermined pressure in the second heat exchanger 116, and expansion valve 130 drops the pressure and temperature of the vaporized $CO_2$ which enters the third heat exchanger 124. A fan or blower 132, directly driven by an electric or hydraulic motor 134, or by a suitable pulley and belt arrangement (not shown) from a suitable power source, draws air 136 from the third conditioned space 114, and discharges conditioned air 138 back into the third conditioned space 114.

FIG. 2 shows a refrigeration system 140 illustrating another embodiment of the invention. Parts of refrigeration system 140 which may be the same as in refrigeration system 10 shown in FIG. 1 utilize the same reference numerals and will not be described in detail. Vessel 18 and the associated pressure regulating arrangement 31 may be used in the embodiment of FIG. 2, especially when the cryogen is $CO_2$, but they are not shown in FIG. 2 as they would be identical to the arrangement shown in FIG. 1.

More specifically, the embodiment of FIG. 2 differs from the embodiment of FIG. 1 by enabling the vaporized $CO_2$ 16 to perform a useful heat absorbing function prior to joining the vaporized $CO_2$ from the first heat exchanger 62 at flow path combining tee 82. A third heat exchanger 142 may be disposed in conduit 74, with the third heat exchanger 142 being disposed in the air conditioning means 54, which is given the reference number 54' in FIG. 2 to note the modification. Thus, fan 68 draws return air 56 from conditioned space 24 in heat exchange relation with heat exchangers 62, 90, and 142, and it discharges conditioned air 58 back into conditioned space 24.

FIG. 3 illustrates a refrigeration system 144 which is a modification of refrigeration system 140 shown in FIG. 2, used when conditioned space 24 is divided into two compartments via divider means 145, creating an additional conditioned space 146. In this instance, the third heat exchanger 142 is disposed in an air conditioning means 148 which includes a fan or blower 150 which draws air 152 from the second conditioned space 146 in heat exchange relation with the third heat exchanger 142, and it discharges conditioned air 154 back into the second conditioned space 146. An electric or hydraulic motor 156, or a belt and pulley arrangement from a suitable power source (not shown), drives fan or blower 150.

FIG. 4 is a diagrammatic representation of a refrigeration system 158 which is similar to refrigeration system 10 shown in FIG. 1, except FIG. 4 adds means for heating conditioned space 24 when required to hold the selected set point temperature, as well as means for heating heat exchangers 62 and 90 for defrosting water ice which may form thereon. Components in FIG. 4 which may be the same as in FIG. 1 are identified with the same reference numbers and will not be described again in detail.

In general, the embodiment of FIG. 4 provides heating functions via the options of adding heat to the liquid $CO_2$ 14 from supply vessel 12 in the first flow path 63; or heat to the vaporized $CO_2$ 16 from supply vessel 12 in the second flow path 72; or heat to the combined flow path 83 following tee 82; or by applying heat directly to vessel 12 to generate vaporized $CO_2$ for use in the second and combined flow paths 72 and 83; or any combination of these heating configurations. In addition, FIG. 4 illustrates an arrangement which provides independent control over fan or blower 68. As disclosed in concurrently filed application Ser. No. 07/982,364, providing independent control over fan or blower 68 enables fan or blower 68 to circulate air throughout conditioned space 24 during cooling and heating cycles, and also without cooling or heating the air of conditioned space 24, e.g., during a null cycle initiated when refrigeration system 158 does not require heating or cooling to maintain the selected set point temperature in conditioned space 24.

More specifically, changes to the FIG. 1 embodiment required to add heat to liquid $CO_2$ 14 from supply vessel 12 in the first flow path 63 include providing heat exchanger means 160 which includes a heat exchanger coil 162. The ends of heat exchanger coil 162 are connected in spaced relation to conduit 64 via conduits 163 and 165 and associated upstream and downstream tees 164 and 166, respectively. A valve 168 is disposed in conduit 64 between tees 164 and 166, and a valve 170 is disposed in conduit 163, between the upstream tee 164 and heat exchanger coil 162. Heat is applied to heat exchanger function 160 when required by a burner 172 and a fuel source 174. Fuel source 174, for example, may be an inflammable gas, such as propane, or an inflammable liquid, such as diesel fuel, with fuel source 174 including a suitable holding vessel, which, in a transport application, would be carried by vehicle 26. In stationary applications other available sources of heat may be used, including electric power, hot liquids, steam, waste gases, and the like. A valve 176 is disposed in a conduit 178 which interconnects fuel source 174 and burner 172.

Changes to the FIG. 1 embodiment required to add heat to vaporized $CO_2$ 16 in the second flow path 72 include providing a heat exchanger coil 180 in heat exchanger means 160. The ends of heat exchanger coil 180 are connected in spaced relation to conduit 74 via conduits 182 and 184 and associated upstream and downstream tees 186 and 188, respectively. A valve 190 is disposed in conduit 74 between tees 186 and 188, and a valve 192 is disposed in conduit 182, between the upstream tee 186 and heat exchanger coil 180. Heat is applied to heat exchanger means 160 when required by the hereinbefore described burner 172, fuel source 174, valve 176 and conduit 178. A valve 194 may be disposed in conduit 74 between vessel 12 and tee 186, if it is desired to close the second flow path 72 while the first flow path 63 is providing a required heating function.

Changes to the FIG. 1 embodiment required to add heat to vaporized $CO_2$ in the third or combined flow path 83 include providing a heat exchanger coil 196 in heat exchanger means 160. The ends of heat exchanger coil 196 are connected in spaced relation to conduit 84 via conduits 198 and 200 and associated upstream and downstream tees 202 and 204, respectively. A valve 206 is disposed in conduit 84 between tees 202 and 204. A valve 208 is disposed in conduit 198, between the upstream tee 202 and heat exchanger coil 196. Heat is applied to heat exchanger means 160, when required, via the hereinbefore described burner 172, fuel source 174, valve 176 and conduit 178.

Heat may be applied directly to vessel 12 via a burner 210 which is connected to fuel source 174 via a conduit 212 and a valve 214. A pressure relief valve 216 is added to vessel 12 in embodiments where heat is applied directly to vessel 12.

Changes to the FIG. 1 embodiment required to provide independent control of vapor motor 70 and fan or blower 68 include a tee 218 in conduit 88, with one branch of tee 218 being connected to heat exchanger 90 via a conduit 220 and a valve 222, and the remaining branch of tee 218 being connected to a venting conduit 224 which includes a valve 226. An open end 228 of conduit 224 vents heated $CO_2$ directly to the atmosphere, in a manner similar to vent 92.

A controllable defrost damper 230 may be added to air conditioning means 54, to enable a discharge air path 232 to be closed by electrical control 22 while heat exchangers 62 and 90 are being defrosted.

To add heat to the first flow path 63, electrical control 22 closes valve 168 and opens valves 170 and 176. The opening of valve 176 is accompanied by the ignition of the gas or liquid from fuel source 174. Liquid $CO_2$ 14 from vessel 12 is completely vaporized and preferably superheated to a predetermined degree in heat exchanger coil 162, with the superheated $CO_2$ vapor being directed through heat exchanger 62, vapor motor 70, and heat exchanger 90. If heat is required to hold the set point temperature in conditioned space 24, damper 230 is allowed to remain open, and if heat is required to defrost heat exchangers 62 and 90, electrical control 22 actuates damper 230 to close the discharge air path 232 between air conditioning means 54 and conditioned space 24. During this time, valve 194 may also be closed to prevent cold vaporized $CO_2$ 16 from mixing with the heated $CO_2$.

To add heat to vaporized $CO_2$ 16 in the second flow path 72, electrical control 22 closes valve 190 and opens valves 192 and 176. The vaporized $CO_2$ is superheated in heat exchanger coil 180, and the superheated $CO_2$ is directed through vapor motor 70 and then through heat exchanger 90. Thus, adding heat to hold set point may be staged when the temperature of conditioned space 24 is below set point, according to the magnitude of the difference. For example, when the temperature of the conditioned space 24 is in a first temperature range below set point, with the first range being a range closest to set point, heat may be provided by the second flow path 72, with liquid feed valve 66 closed. If the temperature of conditioned space 24 drops to a second range, heat may be provided by the first flow path 63. If the temperature of conditioned space 24 drops still further to a third range, heat may be provided by the first and second paths 63 and 72.

In FIG. 4, a cooling cycle may be performed as hereinbefore described relative to FIG. 1, using both heat exchangers 62 and 90. Also, conditioned space 24 may be cooled by the "liquid side" flow path 63 via heat exchanger 62, and vaporized $CO_2$ may be heated in the combined flow path 83 to increase the fan horsepower, if necessary. In this event, valve 222 would be closed and valve 226 would be open, to prevent the hot discharge from vapor motor 70 from affecting the temperature of the conditioned space 24.

The option exists for adding still more heat by activating the third flow path 83 by closing valve 206 and opening valve 208, or by using the third flow path 83 by itself in the hereinbefore mentioned staging of the heat capacity.

The heating of vessel 12 by burner 210 may be used to provide heat for evaporating liquid cryogen to generate additional vapor, such as for driving vapor motor 70 in an independent fan mode when conditioned space 24 is satisfied, i.e., in a null cycle which requires neither cooling nor heating to hold set point. In this mode, feed control valve 66 is closed, valve 222 is closed, and valve 226 is opened. Thus, $CO_2$ vapor from vessel 12 is directed only through vapor motor 70, by-passing the air conditioning means 54.

FIG. 5 illustrates a refrigeration system 234 which is a modification of the refrigeration system 158 shown in FIG. 4. Like components in FIGS. 4 and 5 are identified with like reference numerals. Refrigeration system 234 adds an aspect related to operating vapor motor 70 and associated fan or blower 68 by utilizing vaporized $CO_2$ after all useful cooling and heating functions have been performed by the $CO_2$. Thus, heat may be added to the $CO_2$ vapor just prior to introducing the $CO_2$ vapor into the vapor motor 70, enabling increased horsepower to be achieved during heating and cooling cycles, if required, while still enabling independent fan control during a null cycle.

More specifically, in FIG. 5 vapor motor 70 is moved from the position of FIG. 4, where it is located between conduits 84 and 88, to a position downstream from heat exchanger 90. Thus, conduit 88 is directly connected to the input side of heat exchanger 90, and a conduit 236 is connected from the exit side of heat exchanger 90 to the input side of vapor motor 70. An exhaust conduit 238 vents expended $CO_2$ to the atmosphere from vapor motor 70. Conduit 236 preferably includes a heat exchanger means 240, which includes a heat exchanger coil 241. Heat exchanger coil 241 is heated by a burner 242 which is connected to fuel source 174 via a conduit 244 and a valve 246. A conduit 248 containing a valve 250 interconnects conduit 84 and conduit 236, via a tee 252 in conduit 236 and a four-way connector 254 in conduit 84. Four-way connector 254 replaces tee 202 of the FIG. 4 embodiment.

In the operation of the FIG. 5 embodiment, cooling and heating cycles operate as described relative to the FIG. 1 embodiment, with the exception that the combined flow path 83 is directed to heat exchanger 90, instead of going through vapor motor 70. After all useful cooling has been extracted from the $CO_2$ during a cooling cycle, or all useful heat has been given up by the heated $CO_2$ during a heating cycle, the vaporized $CO_2$ is directed through heat exchanger coil 241 and then through vapor motor 70. Thus, if more air flow and thus more fan horsepower is desired than available from the $CO_2$ as it exits the second heat exchanger 90, electrical control 22 opens valve 246 and ignites burner 242. The $CO_2$ may be heated to any desired temperature in heat exchanger coil 241, as dictated by power requirements, and without regard to the fact that the associated conditioned space 24 is simultaneously being cooled by a cooling cycle, or heated by a heating cycle.

To operate vapor motor 70 and fan or blower 68 in an independent mode during a null cycle, valve 206 is closed, and valve 250 is opened. If more fan power is required than available from the vaporized $CO_2$ 16 in vessel 12, valve 246 may be opened, igniting burner 242; or, valve 214 may be opened, igniting burner 210. Valve 250 may be opened and valve 206 closed for staged cooling or staged heating, as desired, to switch from operating with the two heat exchangers 62 and 90 to operation with only heat exchanger 62, such as when the selected set point temperature is being approached.

FIG. 6 is a diagrammatic representation of a refrigeration system 256 which incorporates the independent fan control mode of FIG. 5 with the option of allowing the second flow path 72 to perform useful heating or cooling functions before being combined with $CO_2$ from the first flow path 63. The flow path "combining"

tee 82 in FIG. 6 is located just upstream from heat exchanger means 240 and vapor motor 70 of the FIG. 5 embodiment.

FIG. 6 illustrates another aspect of the invention wherein each of the heat exchangers 62 and 90 are divided into first and second sections, with pressure regulation and expansion means between the sections, enabling the outermost ends of the sections to be close together for easy insertion of a by-pass valve.

More specifically, heat exchanger 62', now referenced with a prime mark to indicate a modification thereof, is divided into first and second sections 258 and 260, with a pressure regulating valve 262 and expansion valve 264 connected between the sections. A by-pass valve 266 is connected across the ends of heat exchanger 62' via an upstream tee 268 and a downstream tee 270. In like manner heat exchanger 90' is divided into first and second sections 272 and 274 with a pressure regulating valve 276 and an expansion valve 278 connected between the sections. A by-pass valve 280 is connected across the ends of heat exchanger 90' via an upstream tee 282 and a downstream tee 284. The upstream tees 268 and 282 are connected to the first and second flow paths 63 and 72, respectively, and the downstream tees 270 and 284 are connected to the flow path combining tee 82 via conduits 286 and 288, respectively. The flow path combining tee 82 is connected to heat exchanger means 240 via conduits 286 and 288, respectively, via a conduit 290. A conduit 292 connects the exit end of heat exchanger 240 to vapor motor 70.

In the operation of the FIG. 6 embodiment, either or both heat exchangers 62' and 90' may be active or inactive during heating and cooling cycles, in a staged control, with heat being applied to the $CO_2$, if desired, just prior to entering vapor motor 70. In an independent fan control mode during a null cycle, both heat exchangers 62' and 90' are by-passed by opening valves 266 and 280, connecting both flow paths 63 and 72 directly to heat exchanger means 240 and vapor motor 70. The option also exists for adding heat directly to vessel 12 during an independent fan mode. In this embodiment, heat exchanger means 160 is preferably used only for heating and defrost cycles.

As disclosed in concurrently filed application Ser. No. 07/982,333, when the temperature of expended vaporized cryogen exiting any point of a refrigeration system exceeds the ambient temperature, the exiting cryogen may also be directed to any ambient temperature coils or loops to add heat to such coils.

During the operation of the disclosed refrigeration systems in a cooling cycle, it is necessary to maintain the pressure of the cryogen in the flow paths above a predetermined value. Pressure regulators may be located at strategic locations in the flow paths; and/or the vapor pressure in vessel 18 may be used to maintain the pressure in the cryogen flow paths above the predetermined value. A pressure maintaining arrangement 292 for using vapor pressure in vessel 18 for providing such pressure regulation is shown in phantom in FIG. 1. Pressure maintaining arrangement 292 provides a separate flow path to compensate for excessive pressure drop due to reasons such as the length of the fluid flow conduits and heat exchanger Coils. Arrangement 292 includes a conduit 294 which taps conduit 32, and a pressure regulator valve 296 which regulates the pressure in selected flow paths to a predetermined pressure; or, electrical control 22 may select the pressure to be regulated to, as desired. A check valve 298 is illustrated, but may be unnecessary as the vapor pressure in vessel 18 should always be higher than the pressure at a flow path point. A valve (not shown) may also be added to conduit 294, which is controlled by electrical control 22. Conduit 294 may have a smaller opening diameter than the main fluid flow conduits. As indicated in FIG. 1, the flow paths may be tapped and connected to the pressure maintaining arrangement 292 where necessary, such as indicated by broken lines and arrow heads.

While not illustrated in the figures, in order to prevent excessive pressures from building up when the refrigeration systems of the invention are shut down, a pressure relief valve should be added at any location where cryogen may be trapped between two valves at shut down.

Also, while not illustrated, it is to be understood that in transport applications blowers and/or fans driven by electrical motors powered by the vehicle electrical system, or other suitable source, may augment and/or replace the vapor motors, for moving air between the conditioned spaces and the associated heat exchangers. This is also applicable to stationary applications, with the electrical mains being used to power electrical motors connected to fans and/or blowers. Also, in transport applications, the vapor driven motors may drive electrical generators or alternators for the purpose of charging batteries associated with the refrigeration system control.

We claim:

1. A method for controlling the temperature of a conditioned space to a predetermined set point temperature, comprising the steps of:
   providing a supply of cryogen which includes cryogen in liquid and vapor states,
   providing a cooling mode,
   said cooling mode including the step of cooling the air of the conditioned space via at least first heat exchanger means,
   said cooling step including the steps of:
   vaporizing liquid cryogen in the first heat exchanger means,
   combining vaporized cryogen obtained from the vaporizing step with vaporized cryogen from the supply,
   moving air from the conditioned space in heat exchange relation with said first heat exchanger means,
   and using the combined vaporized cryogen to implement the air moving step.

2. The method of claim 1 including the step of regulating the vapor pressure of vaporized cryogen to a point above the triple point of the cryogen, to prevent the formation of solid cryogen.

3. The method of claim 1 wherein the step of using the combined vaporized cryogen to implement the air moving step includes the step of isentropically expanding the combined vaporized cryogen in vapor driven motor means, and using the vapor driven motor means to drive fan means.

4. The method of claim 1 including the step of expanding vaporized cryogen isenthalpically, prior to the air moving step.

5. The method of claim 1 including the step of expanding the combined vaporized cryogen isenthalpically prior to the air moving step.

6. The method of claim 1 including the step of directing vaporized cryogen through second heat exchanger means, and moving air from the conditioned space in heat exchange relation with the second heat exchanger means.

7. The method of claim 6 including the step of dividing the conditioned space into at least first and second conditioned spaces, and the air moving steps direct air from the first and second conditioned spaces in heat exchange relation with the first and second heat exchanger means, respectively.

8. The method of claim 6 wherein the step of directing vaporized cryogen through the second heat exchanger means includes the step of using vaporized cryogen from the supply, prior to the combining step.

9. The method of claim 8 including the step of dividing each of the first and second heat exchanger means into first and second sections, vaporizing the liquid cryogen in the first section of first heat exchanger means, and expanding vaporized cryogen isenthalpically between the first and second sections of the first and second heat exchanger means.

10. The method of claim 8 including the steps of directing combined vaporized cryogen through third heat exchanger means, and moving air from the conditioned space in heat exchange relation with said third heat exchanger means.

11. The method of claim 10 including the steps of:
dividing the conditioned space into first, second and third conditioned spaces,
and the air moving steps respectively direct air from the first, second and third conditioned spaces in heat exchange relation with the first, second and third heat means, respectively.

12. The method of claim 6 wherein the step of directing vaporized cryogen through the second heat exchanger means includes the step of using combined vaporized cryogen.

13. The method of claim 12 wherein the step of directing the combined vaporized cryogen through the second heat exchanger means precedes the step of using the combined vaporized cryogen to implement the air moving step.

14. The method of claim 6 including the steps of directing combined vaporized cryogen through third heat exchanger means, and moving air from the conditioned space in heat exchange relation with the third heat exchanger means.

15. The method of claim 1 wherein the step of providing a supply of cryogen includes the steps of:
filling a first vessel with liquid cryogen,
and expanding liquid cryogen from the first vessel into a second vessel, to provide the supply of cryogen in both liquid and vapor forms in the second vessel.

16. The method of claim 15 wherein the step of filling the first vessel utilizes liquid cryogen supplied by ground support apparatus without deliberate change in pressure.

17. The method of claim 16 wherein the cryogen is $CO_2$.

18. The method of claim 15 wherein the cryogen is $CO_2$.

19. The method of claim 1 including the step of providing a defrosting mode for defrosting the first heat exchanger means,
said defrosting mode including the steps of:
adding heat to vaporized cryogen from the supply,
and directing the heated cryogen in heat exchange relation with the first heat exchanger means.

20. The method of claim 1 including the step of providing a defrosting mode for defrosting the first heat exchanger means,
said defrosting mode including the steps of:
adding heat to the liquid cryogen from the supply, vaporizing the liquid cryogen,
and directing the heated cryogen in heat exchange relation with the first heat exchanger means.

21. The method of claim 1 including the step of providing a defrosting mode for defrosting the first heat exchanger means,
said defrosting mode including the steps of adding heat to both the vaporized and liquid states of the cryogen from the supply, vaporizing the liquid cryogen,
combining the heated cryogen from both the vaporized and liquid states,
and directing the combined heated cryogen in heat exchange relation with the first heat exchanger means.

22. The method of claim 1 including the steps of:
providing a heating mode,
and switching between the cooling and heating modes, as required to hold the predetermined set point temperature,
said heating mode including the steps of:
adding heat to vaporized cryogen from the supply,
and directing the heated cryogen in heat exchange relation with the first heat exchanger means.

23. The method of claim 1 including the steps of:
providing a heating mode,
and switching between the cooling and heating modes, as required to hold the predetermined set point temperature,
said heating mode including the steps of:
adding heat to the liquid cryogen from the supply, vaporizing the liquid cryogen,
and directing the heated vaporized cryogen in heat exchange relation with the first heat exchanger means.

24. The method of claim 1 including the steps of:
providing a heating mode,
and switching between the cooling and heating modes, as required to hold the predetermined set point temperature,
said heating mode including the steps of adding heat to both the vaporized and liquid states of the cryogen from the supply, vaporizing the liquid cryogen,
combining the heated cryogen from both the vaporized and liquid states,
and directing the combined heated cryogen in heat exchange relation with the first heat exchanger means.

25. The method of claim 1 wherein the step of moving air from the conditioned space in heat exchange relation with the first heat exchanger means includes the steps of providing a vapor driven motor and fan,
and further including the step of providing an independent fan control mode,
said independent fan control mode including the steps of:
by-passing the first heat exchanger means,
adding heat to cryogen from the supply,
directing the heated cryogen through the vapor driven motor,
and exhausting the cryogen from the vapor driven motor.

26. The method of claim 25 wherein the step of adding heat to cryogen adds the heat to the vaporized cryogen from the supply.

27. A method for conditioning the air of a conditioned space to a predetermined set point temperature, comprising the steps of:
providing a supply of cryogen which includes cryogen in liquid and vapor states,
and heating the air of the conditioned space via at least first heat exchanger means with the supply of cryogen,
said heating step including the steps of:
adding heat to vaporized cryogen from the supply to provide a first heated source of cryogen,
adding heat to the liquid cryogen from the supply, vaporizing the liquid cryogen, to provide a second heated source of cryogen,
combining the first and second heated sources of cryogen,
and directing the combined heated cryogen through the first heat exchanger means.

28. The method of claim 27 including the step of moving air from the conditioned space in heat exchange relation with the first heat exchanger means,
said air moving step including the steps of:
providing a vapor driven motor and fan,
and directing the combined heated cryogen through the vapor driven motor.

29. A method of using a cryogen to maintain a predetermined set point temperature in a conditioned space, comprising the steps of:
providing first and second vessels,
filling said first vessel with a liquid cryogen which has a predetermined first pressure,
transferring cryogen from the first vessel to the second vessel as a function of the requirements of the conditioned space, with the cryogen in the second vessel being at a second pressure which is lower than the first pressure, resulting in the cryogen in the second vessel being in both liquid and vapor states,
and using both the liquid and vapor states of the cryogen in the second vessel to maintain the predetermined set point temperature of the conditioned space.

30. The method of claim 29 wherein the cryogen is $CO_2$.

31. A refrigeration system for controlling the temperature of a conditioned space to a predetermined set point temperature via a cooling mode, including a supply of cryogen which includes cryogen in liquid and vapor states, first heat exchanger means, means directing liquid cryogen from the supply through the first heat exchanger means, vapor driven motor means, and fan means driven by the vapor driven motor means which moves air from the conditioned space in heat exchange relation with the first heat exchanger means, to vaporize the liquid cryogen, the improvement comprising:
means combining vaporized cryogen provided by the first heat exchanger means with vaporized cryogen from the supply,
and means directing the combined vaporized cryogen through the vapor driven motor means to drive the motor and fan means.

32. The refrigeration system of claim 31 including regulating means for regulating the vapor pressure of the vaporized cryogen to a point above the triple point of the cryogen, to prevent the formation of solid cryogen.

33. The refrigeration system of claim 31 including expansion means for expanding the combined vaporized cryogen isenthalpically, and wherein the means for directing the vaporized cryogen through the vapor driven motor means directs the expanded cryogen provided by the expansion means.

34. The refrigeration system of claim 31 including second heat exchanger means, and means directing vaporized cryogen through said second heat exchanger means, with the vapor driven motor and fan means moving air from the conditioned space in heat exchange relation with said second heat exchanger means.

35. The refrigeration system of claim 34 wherein the second heat exchanger means is disposed such that the directing means directs vaporized cryogen from the supply through the second heat exchanger means, prior to the means for combining the vaporized cryogen.

36. The refrigeration system of claim 35 wherein each of the first and second heat exchanger means include first and second sections, with liquid cryogen being vaporized in the first section of first heat exchanger means, and first and second expansion means disposed to respectively expand vaporized cryogen isenthalpically between the first and second sections of the first and second heat exchanger means.

37. The refrigeration system of claim 35 including means dividing the conditioned space into first, second and third conditioned spaces, third heat exchanger means, means for directing combined vaporized cryogen through said third heat exchanger means, with the vapor driven motor means and fan means moving air from the first conditioned space in heat exchange relation with the first heat exchanger means, and including additional fan means for moving air from the second and third conditioned spaces in heat exchange relation with the second and third heat exchanger means, respectively.

38. The refrigeration system of claim 34 wherein the second heat exchanger means is disposed such the directing means directs combined vaporized cryogen through the second heat exchanger means.

39. The refrigeration system of claim 38 wherein the vapor driven motor means is disposed downstream from the second heat exchanger means, such that the vapor driven motor means receives combined vaporized cryogen after the combined vaporized cryogen has been directed through the second heat exchanger means.

40. The refrigeration system of claim 34 including third heat exchanger means, and means directing combined vaporized cryogen through said third heat exchanger means, with the vapor driven motor means and fan means moving air from the conditioned space in heat exchange relation with the third heat exchanger means.

41. The refrigeration system of claim 31 including second heat exchanger means, means directing vaporized cryogen through said second heat exchanger means, means dividing the conditioned space into at least first and second conditioned spaces, with the vapor driven motor and fan means moving air from the first conditioned space in heat exchange relation with the first heat exchanger means, and including fan means for moving air from the second conditioned space in heat exchange relation with the second heat exchanger means.

42. The refrigeration system of claim 31 including first and second vessels, with the supply of cryogen being in the second vessel,
liquid cryogen in the first vessel,
and expansion means providing the supply of cryogen in the second vessel by expanding liquid cryogen from the first vessel into the second vessel.

43. The refrigeration system of claim 42 wherein the cryogen is $CO_2$.

44. The refrigeration system of claim 31 including defrost means for providing a defrost mode which defrosts the first heat exchanger means, and wherein the defrost means includes means disposed upstream from the first heat exchanger means for adding heat to the liquid cryogen from the supply.

45. The refrigeration system of claim 44 including second heat exchanger means disposed to receive vaporized cryogen, and wherein the defrost means includes means disposed upstream from the second heat exchanger means for adding heat to the vaporized cryogen.

46. The refrigeration system of claim 45 wherein the second heat exchanger means is disposed to receive vaporized cryogen from the supply, prior to the combining means.

47. The refrigeration system of claim 31 including heat means for providing a heating mode in addition to the cooling mode for holding the predetermined set point temperature, and wherein the heat means includes means disposed upstream from the first heat exchanger means for adding heat to the liquid cryogen from the supply.

48. The refrigeration system of claim 47 including second heat exchanger means disposed to receive vaporized cryogen, and wherein the heat means includes means disposed upstream from the second heat exchanger means for adding heat to the vaporized cryogen.

49. The refrigeration system of claim 48 wherein the second heat exchanger means is disposed to receive vaporized cryogen from the supply, prior to the combining means.

50. The refrigeration system of claim 31 including independent fan control means for operating the gas driven motor means and fan means,
said independent fan control means including means for adding heat to the cryogen,
and means for directing the heated cryogen through the vapor driven motor while by-passing the first heat exchanger means.

51. The refrigeration system of claim 50 wherein the means for adding heat to the cryogen adds the heat to the vaporized cryogen from the supply.

52. A refrigeration system for controlling the temperature of a conditioned space to a predetermined set point temperature via a heating mode, comprising:
a supply of cryogen which includes cryogen in liquid and vapor states,
heat exchanger means,
means for adding heat to vaporized cryogen from the supply to provide a first heated source of cryogen,
means for adding heat to the liquid cryogen from the supply, to vaporize the liquid cryogen and provide a second heated source of cryogen,
means for combining the first and second heated sources of cryogen,
and means for directing the combined heated cryogen in heat exchange relation with the heat exchanger means.

53. The refrigeration system of claim 52 including a vapor driven motor and fan disposed to move air from the conditioned space in heat exchange relation with the heat exchanger means, and including means for directing the combined heated cryogen through the vapor driven motor.

54. The refrigeration system of claim 53 wherein the vapor driven motor is disposed downstream from the heat exchanger means.

55. The refrigeration system of claim 53 wherein the vapor driven motor is disposed upstream from the heat exchanger means.

56. A refrigeration system which uses a cryogen to maintain a predetermined set point temperature in a conditioned space, comprising:
first and second vessels,
said first vessel being initially substantially filled with a liquid cryogen,
control means between the first and second vessels which admits cryogen into the second vessel from the first vessel as a function of the requirements of the conditioned space, with the cryogen in the second vessel being at a lower pressure than in the first vessel, providing the cryogen in both the liquid and vapor states in the second vessel,
and means using both the liquid and vapor states of the cryogen in the second vessel to maintain the predetermined set point temperature of the conditioned space.

57. The refrigeration system of claim 56 wherein the cryogen is $CO_2$.

* * * * *